Patented Apr. 11, 1944

2,346,350

UNITED STATES PATENT OFFICE 2,346,350

HIGHLY SUBSTITUTED ACETONE-SOLUBLE CELLULOSE ACETATE

Ernst Berl and Walter George Berl, Pittsburgh, Pa.

No Drawing. Application April 2, 1941, Serial No. 386,558

23 Claims. (Cl. 260—230)

Cellulose triacetates (containing between 62.2 and 58.6% bound acetic acid compared with 62.5% bound acetic acid for the chemically pure (C. P.) cellulose triacetates) swell in acetone (especially with HAc contents below 59.5%) but do not dissolve. Therefore, low-boiling, chlorinated hydrocarbons, like dichlormethane, or chloroform, without or with the addition of small amounts of alcohol have to be used as solvents in order to make filaments, foils, etc. The disadvantage of these cellulose acetates containing more than 58.5% bound acetic acid, being insoluble in acetone and soluble only in chlorinated hydrocarbons, has prevented the larger use of these materials up to this time. They show furthermore the disadvantage of not being compatible with those plasticizers and softening agents which are used now on a large scale to make plastics of all kinds from cellulose acetates.

On the other hand, those cellulose acetates with high acetyl content can be produced with yields which are higher than those which are obtained after a strong retroacetylation in order to get acetone-soluble materials with the maximum content in bound acetic acid of 58.5%, or 55%, or 51%. Furthermore, these highly acetylated, normally acetone-insoluble cellulose acetates show much higher resistance towards water than the acetone-soluble acetates. The tensile strength of objects (filaments, foils, etc.) made from those highly acetylated cellulose acetates in wet state is much higher than the wet tensile strength of the same articles made from cellulose acetates with acetic acid contents below 58.5%.

The very remarkable fact has been found that non-stabilized or stabilized highly acetylated cellulose acetates with acetic acid contents from 58.5% up to 62.2% can be made acetone soluble or soluble in solvents with similar solvent characteristics as acetone, for instance higher aliphatic ketones, in destroying the fiber structure, and submitting the suspension of this material in acetone or similar acting solvents to lower temperatures, down to —50° or —70° C., and raising the temperature afterwards to room temperature, or to higher temperatures. The destruction of the fiber structure of this highly acetylated material can be made by dissolving or swelling those materials in lower fatty acids, for instance acetic acid or formic acid, or in appropriate solvents, for instance dichlormethane, chloroform, tetrachlorethane, etc. In case the destruction of the fiber structure has to be made by solution in lower fatty acids, buffer salts, like sodium acetate or sodium formate, may be added if no previous stabilization has been carried out. One can heat these solutions or swellings in those lower fatty acids during short time periods at increased temperature, or during longer time periods at lower temperature, for instance one can heat those highly acetylated acetates in acetic or formic acid from 5 minutes to 12 hours at 95° C. Then one can change fundamentally the structure of such a cellulose acetate micell. The following table shows the amount of bound acetic acid after different times of heating in 95% acetic acid in presence of small amounts of buffer salts (1% of the weight of the cellulose acetate).

| Bound acetic acid | Time |
|---|---|
| Per cent | Hours |
| 62.1 | 0 |
| 62.1 | 0.1 |
| 61.2 | 4 |
| 60.8 | 8 |
| 60.5 | 10 |
| 59.8 | 12 |

The dissolved (for example, those which result in the now normally used acetylation process before or during the retroacetylation of the formed, highly acetylated cellulose acetates) or swollen acetates can be coagulated in a known way by adding water or diluted acetic acid to this solution or swelling. The strong acetic acid used as solvent or as swelling agent, is converted into watery acid of about 15–30% acid content. The resulting partly deacetylated cellulose acetate can be used either as such or, if necessary, it may undergo an additional stabilization, for instance according to the U. S. Patent 2,039,290, by boiling it several times with 1 or 2% sodium sulfate solution.

One can destroy also the fiber structure when triacetate has been produced by processes which furnish fibrous triacetate by dissolving it completely or by swelling it in chlorinated hydrocarbons, for instance dichlormethane, chloroform, tetrachlorethane, etc.

These acetates with acetic acid contents above 58.5% swell with acetone or similar acting solvents but they do not dissolve. By cooling this suspension (swelling) of these highly acetylated acetates with destroyed fiber structure a complete acetone solubility can be reached by cooling down those suspensions to low temperatures, for instance —50° or —70° C. After having brought back the material to room temperature the material is now completely acetone soluble.

The same phenomena cannot be observed with those cellulose triacetates which have retained their fiber structure. These highly acetylated acetates suspended in acetone or similar acting solvents after having been subjected to low temperature and after having been reheated to room or somewhat elevated temperature show very little, if any, solubility in this common solvent for lower acetylated acetates.

The remarkable fact is observed that after evaporation of acetone or similar solvents, for instance higher aliphatic ketones, the resulting cellulose acetate is now again insoluble in those ketones or similar acting solvents. One can make those material again acetone soluble by cooling down such suspensions of now again insoluble, highly acetylated cellulose acetates in acetone to low temperatures and bringing those suspensions back to room temperature. Then the material becomes again soluble in acetone. These processes of making those materials soluble in acetone and insoluble after evaporation and making them again soluble in cold acetone can be repeated indefinitely.

For the first time, by the destruction of the fiber structure of the triacetylated cellulose acetate without or with a slight retroacetylation by treatment with volatile fatty acids without or with the addition of buffer salts at room or elevated temperature, isolation of the dissolved or swollen material which may or may not contain the same amount of bound acetic acid as the parent material, its treatment by cooling it in acetone or similar acting solvents and by raising the temperature to room or elevated temperatures, those formerly acetone-insoluble materials become once more acetone soluble.

The same fundamental change in the behavior can be observed by the treatment of those highly acetylated acetates which have lost their fiber structure with the same plasticizers and softening agents which are in common use with acetone-soluble acetates at lower temperature in presence or absence of acetone or similar acting acetone-soluble materials.

This behavior of becoming once again insoluble in acetone can be found with partly retroacetylated acetates with acetic acid contents higher than 58.5%.

The same results are observed with mixed esters, for instance aceto-formates or aceto-propionates, which have not obtained acetone solubility because either the amount of bound second acid, for instance formic acid, or propionic acid, or butyric acid, is not high enough to secure the acetone solubility of a completely esterified material, or the amount of free non-substituted hydroxyl groups is not great enough to cause the same acetone solubility.

By this newly invented process important progress has been made because now cellulose acetates with rather high contents of bound acetic acid, or mixed esters, like aceto-formates, aceto-propionates, or aceto-butyrates, which previously were acetone insoluble can now be made acetone soluble. One can now combine the favorable properties of cellulose triacetate—higher yield, higher resistance towards water, certain special dyeing properties—with their acetone solubility. The fact that after evaporation of the acetone it now becomes again strongly insoluble is also a great advantage. Those regenerated acetone-insoluble materials have now the same valuable properties as those highly acetylated, or otherwise highly substituted, cellulose esters. Their melting and softening point is higher than that of the acetone-soluble esters; therefore, their resistance against higher temperature, for instance during ironing, has greatly improved.

The dyeing qualities of the acetone-insoluble, higher-substituted esters are not changed by this process of making those materials acetone soluble only once by subjecting them in presence of a ketone solvent to lower temperature and raising this temperature to room or somewhat elevated temperature.

*Example 1*

Fibrous cellulose triacetate with acetyl contents higher than 60%, and preferably between 62.0 and 62.2%, is dissolved in cold or hot glacial acetic acid. The cellulose triacetate practically unchanged concerning the amount of bound acetic acid is precipitated by the addition of water or diluted acetic acid in such a way that the resulting diluted acetic acid contains between 10 and 30% acetic acid. The precipitated material will be washed free of acetic acid. Any other non-solvent for triacetate miscible with acetic acid may be used for this precipitation. The triacetate, the fiber structure of which is now destroyed, can be stabilized if necessary, for instance using the U. S. Patent 2,039,290. After having been dried, this material is treated with acetone cooled down to —50 or —70° C. After reaching room temperature again, the cellulose triacetate proves to be completely soluble in acetone. One can produce in known ways from this solution of cellulose triacetate in acetone desired materials, like filaments, foils, films, plastics, etc. After the acetone has been evaporated the resulting solid material is now insoluble in acetone at room temperature, is again soluble in cold acetone after having reached room temperature. This process of making the cellulose triacetate acetone soluble and again acetone insoluble can be repeated indefinitely.

*Example 2*

In substituting formic acid for acetic acid one gets the same results. Fibrous cellulose triacetate which in this state is insoluble in acetone at room temperature and very little soluble in acetone at —70° C. shows, therefore, different solubility characteristics when the fiber structure of this fibrous cellulose triacetate is destroyed whereby the amount of bound acetic acid may remain unchanged.

*Example 3*

The same results as described in Examples 1 and 2 are observed if another volatile fatty acid or any other acid which can dissolve cellulose triacetate under destruction of the fiber structure is used instead of acetic or formic acid.

*Example 4*

Fibrous cellulose triacetate is dissolved in warm acetic acid of about 94% acetic acid content. 1 to 2% of the weight of the used cellulose triacetate of sodium acetate is added and a retroacetylation, according to the U. S. Patent 2,175,103, is carried out. The resulting partially retroacetylated cellulose acetates with acetic acid contents above 58.5% are insoluble in acetone at room temperature but swell. When subjected to lower temperatures, this material which also has lost its fiber structure becomes easily soluble in acetone after having reached elevated temperatures.

Resulting filaments or foils, etc., made from this partially retroactylated, non-fibrous, originally acetone-insoluble cellulose acetate show high stability, increased tensile strength when wet compared with the tensile strength of articles of the same character but made from acetone-soluble acetate with bound acetic acid in the neigborhood of 51–55%.

*Example 5*

The same effect as described in Example 4 can be observed by partially retroacetylating fibrous cellulose triacetate dissolved in 90% formic acid without or with the addition of small amounts of sodium formate. The material after having been isolated by dilution with water or other non-solvents for cellulose acetate swells at room temperature in acetone when the amount of the bound fatty acids, calculated as acetic acid, in it is higher than 59%. A small amount of formic acid is bound in this non-fibrous cellulose acetoformate. This partly retroacetylated mixed ester swells in acetone at room temperature but is soluble in cold acetone (−20° C. to −94° C.), especially when the system reaches room or somewhat elevated temperature after having been cooled. This material, in spite of its high amount of total bound, lower aliphatic acid can be used with excellent success for molding and similar purposes when cooled down first with plasticizers and softening agents with or without the addition of volatile solvents like acetone and homologues.

*Example 6*

The same results as described in Example 5 can be obtained if this partial retroacetylation is carried out with propionic or butyric acid with or without the addition of small amounts of buffer salts like the alkali salts of the retroacetylating acids. The resulting materials after slight retroacetylation swell in acetone at room temperature but do not dissolve. After having cooled down this suspension to low temperature, and after heating it up to room or somewhat elevated temperature, complete solubility can be observed. Here again after evaporation of acetone, solubility of this retroacetylated material in acetone at room temperature cannot be observed.

*Example 7*

Fibrous, acetone-insoluble cellulose triacetate is wetted with small amounts of lower fatty acid, like strong acetic acid, strong formic acid, strong propionic acid, in such a way that the fiber structure is completely destroyed. Upon addition of cooled acetone and after having reached room or somewhat elevated temperature, complete solubility of this now non-fibrous material in acetone can be observed.

*Example 8*

Fibrous cellulose triacetate is dissolved in solvents, for instance dichlormethane, chloroform, tetrachlorethane. The solvent is evaporated and material is obtained which has exactly the same amount of bound acetic acid as the fibrous triacetate which is insoluble, or very little soluble, in acetone or higher ketones at room temperature or at −70° C. The resulting material which no longer shows fiber structure treated with cold acetone becomes easily soluble in it after the system has reached room or somewhat elevated temperature. One can make filaments, foils, or any other geometric object from this acetone solution of cellulose triacetate. The now resulting articles are insoluble in acetone at room temperature, but are soluble in cold acetone.

*Example 9*

Cellulose triacetate insoluble in acetone at room temperature or low temperature is strongly swollen with solvents, for instance chlorinated hydrocarbons, in such a way that the fiber structure is completely destroyed. This material becomes soluble in cold acetone after having reached room temperature. This solubility cannot be observed if the chlorinated hydrocarbon solvent and the same amount of cold acetone are added to this fibrous cellulose triacetate because in the latter case there is no destruction of the fiber structure.

*Example 10*

Cellulose acetate produced in the normal way by the acetylation of cellulose in presence of a solvent for cellulose triacetate, for instance glacial acetic acid, dichlormethane, etc. can be precipitated with non-solvents, for instance water, ether, ethanol. Cellulose acetate results with bound acetic acid between 60 and 62%. This neutral, washed and, if necessary, stabilized material is soluble in cooled acetone at temperatures ranging between −20 to −94° C.

*Example 11*

Cellulose triacetate prepared as described in Example 10 is retroacetylated after the destruction of the remaining acetic anhydride and after addition of an increased amount of catalyzing acid, for example sulphuric acid, in the very well known way. The resulting retroacetylated material with bound acetic acid contents above 58.5% swells in acetone at room temperature but is not completely soluble in the solvent. If subjected with acetone or a similar acting solvent to low temperature (−20° to −94° C.), it becomes soluble at room temperature or somewhat elevated temperature.

*Example 12*

Pseudo acetone soluble acetates can be obtained by treatment of fibrous cellulose triacetate without destruction of its fiber structure either with acids in watery solution, for example diluted nitric acid, or by a treatment with higher alcohols, for instance butanol, or with weak bases, like pyridine. In all these cases where the retroacetylation is carried out in a two-phase system (fibrous acetate, retroacetylation liquid), there result pseudo acetone soluble, fibrous cellulose acetates with practically the same amount of bound acetic acid as the acetone true soluble acetates when those are produced in a homogeneous system. Those pseudo acetone soluble acetates with for instance 55% bound acetic acid are soluble once in acetone at room temperature. They become, after evaporation of this acetone, acetone insoluble. If treated with cooled acetone between −20° C. and the freezing point of acetone (−94° C.), those materials become again acetone soluble after reaching room temperature.

Other modifications of our invention, all within its scope, will readily occur to the expert. The scope of our invention is therefore deemed to be limited by the appended claims only.

We claim:

1. The process of making acetone-soluble an acetone-insoluble fibrous highly acetylated cellulose acetate containing at least 58.5% of bound acetic acid, comprising preparing a suspension of said acetate with destroyed fiber structure in acetone and subjecting said suspension to a temperature below —20° C.

2. The process of making acetone-soluble an acetone-insoluble fibrous cellulose triacetate containing at least 58.5% of bound acetic acid, comprising preparing a suspension of said triacetate with destroyed fiber structure in acetone and subjecting said suspension to a temperature below —20° C.

3. The process of making acetone-soluble an acetone-insoluble highly substituted cellulose acetone containing at least 58.5% of bound acetic acid, resulting from the evaporation of its solution in acetone, comprising suspending said cellulose acetate with destroyed fiber structure in acetone and subjecting said suspension to a temperature below —20° C.

4. The process of making highly acetylated fibrous cellulose acetate containing at least 58.5% of bound acetic acid and originally insoluble in said acetone, soluble in said acetone, comprising destroying the fiber structure of said acetate without changing fundamentally the composition of the acetate and then subjecting the suspension of said acetate in acetone to a temperature below —20° C.

5. In a process according to claim 4, the final step of raising the temperature to at least room temperature.

6. The process of making highly acetylated fibrous cellulose acetate containing at least 58.5% of bound acetic acid and originally insoluble in said acetone, soluble in said acetone, comprising destroying the fiber structure of said acetate without changing fundamentally the composition of the acetate and then subjecting the suspension of said acetate in acetone to a temperature of —50° C.

7. The process of making highly acetylated fibrous cellulose acetate containing at least 58.5% of bound acetic acid and originally insoluble in said acetone, soluble in said acetone, comprising destroying the fiber structure of said acetate without changing fundamentally the composition of the acetate and then subjecting the suspension of said acetate in acetone to a temperature of less than —50° C.

8. The process of making highly acetylated fibrous cellulose acetate containing at least 58.5% of bound acetic acid and originally insoluble in said acetone, soluble in said acetone, comprising destroying the fiber structure of said acetate without changing fundamentally the composition of the acetate and then subjecting the suspension of said acetate in acetone to a temperature between —50 and —70° C.

9. The process of making acetone-soluble an acetone-insoluble highly acetylated fibrous cellulose acetate containing at least 58.5% of bound acetic acid, comprising destroying the fiber structure of said acetate by dissolving it in a solvent without changing fundamentally the composition of said cellulose acetate, isolating said acetone insoluble cellulose acetate, and then subjecting the suspension of said acetate in acetone to a temperature below —20° C.

10. The process of making acetone-soluble an acetone-insoluble highly acetylated fibrous cellulose acetate containing at least 58.5% of bound acetic acid, comprising destroying the fiber structure of said acetate by dissolving it in a lower fatty acid without changing fundamentally the composition of said cellulose acetate, isolating said cellulose acetate, and then subjecting the suspension of said acetate in acetone to a temperature below —20° C.

11. The process of making acetone-soluble an acetone-insoluble highly substituted fibrous cellulose acetate containing at least 58.5% of bound acetic acid, comprising destroying the fiber structure of said acetate by dissolving it in a lower fatty acid, slightly retroacetylating the dissolved cellulose acetate without changing its acetone insolubility, isolating said acetate from the solution, and subjecting the suspension of said slightly retroacetylated acetate in acetone to a temperature below —20° C.

12. The process of making acetone-soluble an acetone-insoluble highly acetylated fibrous cellulose acetate containing at least 58.5% of bound acetic acid, comprising destroying the fiber structure of said acetate by dissolving it in a lower fatty acid at higher temperature, adding a buffer salt, treating said solution at higher temperature without changing fundamentally the insolubility of said cellulose acetate in acetone, isolating said cellulose acetate, and then subjecting the suspension of said acetate in acetone to a temperature below —20° C.

13. The process of making acetone-soluble an acetone-insoluble highly acetylated fibrous cellulose acetate containing at least 58.5% of bound acetic acid, comprising destroying the fiber structure of said acetate by dissolving it in a chlorinated hydrocarbon capable of dissolving said acetate, eliminating the solvent and subjecting the suspension of said acetate in acetone to a temperature below —20° C.

14. The process of making acetone-soluble an acetone-insoluble highly substituted cellulose acetate containing at least 58.5% of bound acetic acid, with fiber structure already destroyed by the process of acetylation, isolating said acetate insoluble in acetone from the solution and subjecting the suspension of said acetate in acetone to a temeprature below —20° C.

15. The process of making acetone-soluble an acetone-insoluble highly substituted mixed cellulose aceto-ester derivative of one of the first four members of the fatty acid series, containing more bound acetic acid than a corresponding fibrous acetone-insoluble mixed cellulose aceto-ester, comprising subjecting a suspension of said mixed ester with detroyed fiber structure without fundamental change of the composition of said mixed cellulose ester into acetone to temperature below —20° C.

16. The process of making acetone-soluble an acetone-insoluble highly substituted mixed cellulose aceto-ester derivative of one of the first four members of the fatty acid series, containing more bound acetic acid than a corresponding fibrous acetone-insoluble mixed cellulose aceto-ester, comprising subjecting a suspension of said mixed ester with destroyed fiber structure without fundamental change of the composition of said mixed cellulose ester into acetone to a temperature between —50 and —70° C.

17. As a new composition of matter a highly acetylated non-fibrous cellulose acetate containing at least 58.5% of bound acetic acid, originally insoluble in acetone and made soluble in acetone without change in the chemical composition, by subjecting a suspension in acetone of said acetate with destroyed fiber structure to a temperature below —20° C.

18. As a new composition of matter, a non-fibrous cellulose triacetate containing at least 58.5% of bound acetic acid, originally insoluble in acetone and made soluble in acetone without change in the chemical composition, by subjecting a suspension in acetone of said triacetate with destroyed fiber structure to a temperature below —20° C.

19. As a new composition of matter, an acetone solution of non-fibrous highly acetylated cellulose acetate containing at least 58.5% of bound acetic acid, originally insoluble in acetone and made soluble in acetone without change in the chemical composition, by subjecting a suspension in acetone of said acetate with destroyed fiber structure to a temperature below —20° C.

20. As a new composition of matter, an acetone solution of non-fibrous cellulose triacetate containing at least 58.5% of bound acetic acid, originally insoluble in acetone and made soluble in acetone without change in the chemical composition, by subjecting a suspension in acetone of said triacetate with destroyed fiber structure to a temperature below —20° C.

21. As a new composition of matter, a non-fibrous acetone-soluble highly substituted cellulose acetate containing at least 58.5% of bound acetic acid obtained by destroying the fiber structure of acetone-insoluble highly substituted fibrous cellulose acetate containing at least 58.5% of bound acetic acid, without changing fundamentally the composition of said acetate and subjecting its suspension in acetone to a temperature below —20° C.

22. As a new composition of matter, a non-fibrous acetone-soluble cellulose triacetate containing at least 58.5% of bound acetic acid, obtained by destroying the fiber structure of acetone-insoluble fibrous cellulose triacetate containing at least 58.5% of bound acetic acid, without changing fundamentally the composition of said triacetate and subjecting its suspension in acetone to a temperature below —20° C.

23. As a new composition of matter, highly acetylated cellulose acetate originally insoluble in water-soluble aliphatic ketones of the general formula $R-CO-R_1$ whereby $R$ and $R_1$ are alkyl groups and made soluble in said water-soluble aliphatic ketones without change in the chemical composition by subjecting a suspension in said water-soluble aliphatic ketone said cellulose acetate with destroyed fiber structure to a temperature below —20° C.

ERNST BERL.
WALTER GEORGE BERL.